T. Sharp.
Cider Mill.
No. 40,711. Patented Nov. 24, 1863.
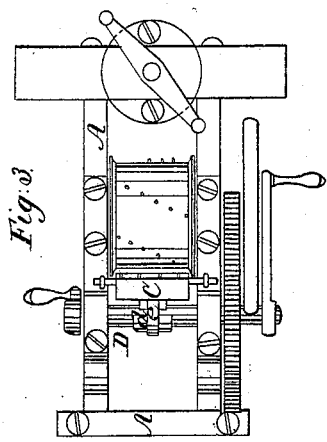
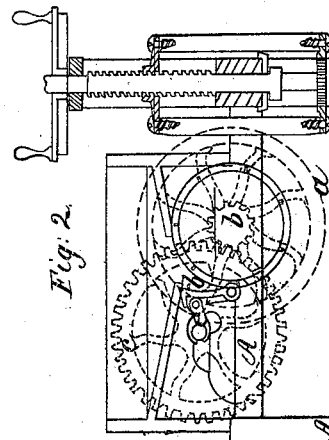
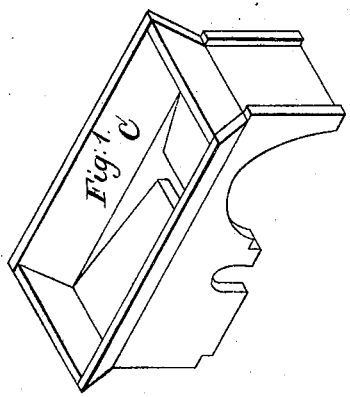
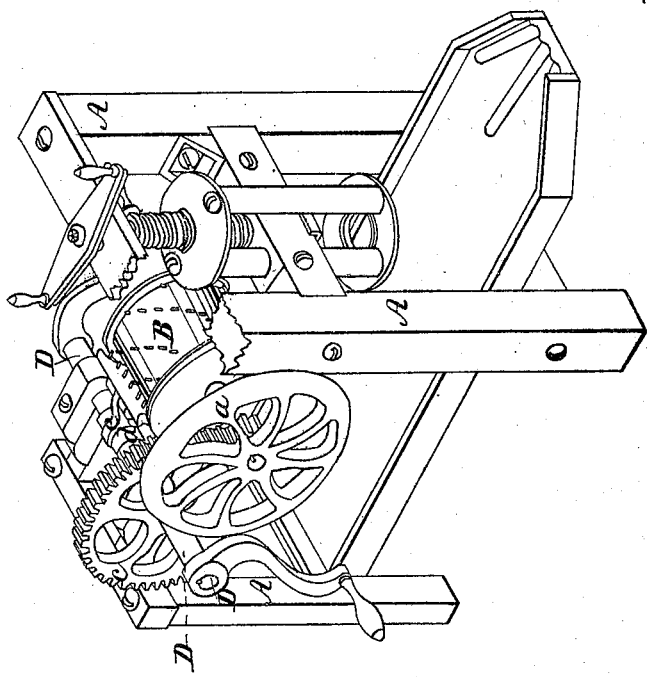
Witnesses;
Wm D. Baldwin
B. Boberson.
Inventor;
T. Sharp
By Henry Baldwin
Attorney

UNITED STATES PATENT OFFICE.

THEODORE SHARP, OF LOUISVILLE, KENTUCKY.

IMPROVEMENT IN CIDER-MILLS.

Specification forming part of Letters Patent No. 40,711, dated November 24, 1863.

*To all whom it may concern:*

Be it known that I, THEODORE SHARP, of Louisville, in the county of Jefferson and State of Kentucky, have invented certain new and useful Improvements in Cider-Mills, of which the following is a full, clear, and exact description, reference being had to the accompanying drawings, which make part of this specification, and in which—

Figure 1 represents a perspective view of my improved cider-mill with the hopper detached; Fig. 3, a plan of the same; Fig. 2, a vertical, central, and longitudinal section.

In all of the apple-grinding machines with which I am acquainted of that class which employ reciprocating plungers or concave pressers to press the apples against a toothed grinding-cylinder the plungers are used in pairs, and move in regular alternation to and from the cylinder in a horizontal plane, while those machines that use the concave also use it in pairs or divided virtically in the center, and so arranged as to cause the concave to move to and from the cylinder in halves in regular alternations, thus both modes of using divided pressers alternately release the one-half of the apples from any grinding contact with the cylinder, and cause a large space to be filled with fresh fruit before that first fed from the hopper is sufficiently ground to freely escape from the mill, and permit the loose apples first fed and those partially ground to turn loosely in this comparatively free space, and thus pack and clog the machine.

Now, it is the object of my invention to obviate the defects of this class of machines and to render this mode of pressure perfectly effective. And my invention consists in the employment of a single concave reciprocating presser as wide as the grinding-cylinder, and so arranged as to hold the apples fed into the mill so that they must be grated to pomace and freely discharged therefrom.

To enable others skilled in the art to make and use my invention, I will proceed to describe its construction and operation.

Within a frame, A, of proper construction, I place a grinding-cylinder, B, the journals of which are supported in boxes resting on the frame, and arranged to permit the shaft a free rotation. The shaft carries a fly-wheel, $a$, to equalize its movement. On the surface of this cylinder B, I arrange, in spiral rows parallel to each other, a suitable number of grinding-teeth to reduce or grind the apples fed to it through the hopper C, and the cylinder has a flange on each end. One of the journals of cylinder B carries a cogged pinion, $b$, which gears with the driving-gear wheel $c$ on the driving-shaft D. This driving-shaft D is attached by suitable journal-boxes to the frame and supported in a plane above that of the journals of the cylinder B. It may be driven by any suitable power, though in the drawing it is shown as driven by hand, there being a crank arm and handle on each end of the shaft. In the center of the shaft I form a crank, $d$, that, by a connecing rod or strap, $e$, unites it with the concave plate E. This concave E is of a length that will permit it to pass within the flanges of the cylinder when pressed toward it, and as wide as the half-diameter of the cylinder, and is bent in the arc of a circle of a radius larger than the cylinder, or of any suitable curve to preserve the proper feeding-space betwen it and the grinding-cylinder. Lugs are attached to the back of the concave near its center, to which one end of the connecting rod or strap $e$ is pivoted, and its lower edge carries journals that are, or a rod that is, supported in proper bearings on the frame and in the same plane with the grinding-cylinder. The lower edge of the concave is rounded away over its whole length, and carries a row or rows of teeth or spikes that project from it near to the points of the teeth of the cylinder, while its upper edge carries a row or rows of teeth or spikes that, in its forward movement, penetrate the apples as they are fed and hold them to the cylinder to be ground by its teeth or reduced to pomace.

The operation is extremely efficient. As the apples pass from the hopper, they are received within the space between the grinding cylinder and concave. The rotation of the main shaft D reciprocates the concave and puts the grinding-cylinder in rapid rotation. On the approach of the the upper edge of the concave toward the cylinder the apples are penetrated by the spikes thereon and held against the cylinder until reduced to a size that will permit them to pass from the spikes toward the bottom edge of the concave, which, having there a row of teeth, and being always a determined distance from the cylinder, will hold the broken fruit until sufficiently reduced by the cylinder to escape freely from between it and the concave into or onto any proper receptacle. Thus it will be perceived that by using a single concave of the construction I have invented, instead of one operating in pairs, the action of the gravity of the fruit and the pressure of the machine will be uniform, and that by holding the apples on the spikes as they enter between the concave and the cylinder, they will be so uniformly and regularly reduced in their progress as to render choking or clogging of the machine almost impossible.

What I claim as my invention, and desire to secure by Letters Patent of the United States, is—

1. The single concave constructed and arranged in the manner described, to vibrate across the face of the main cylinder and between its flanges, as and for the purpose set forth.

2. The combination of a single concave constructed substantially in the manner described, with a flanged main cylinder and hopper arranged as and for the purposes set forth.

In witness whereof I have hereunto subscribed my name.

THEODORE SHARP.

Witnesses:
  J. A. MOORE,
  WM. LANE.